Dec. 1, 1931.  M. H. LOUGHRIDGE  1,834,411
RAILWAY AND OTHER VEHICLE
Filed May 7, 1927  4 Sheets-Sheet 3
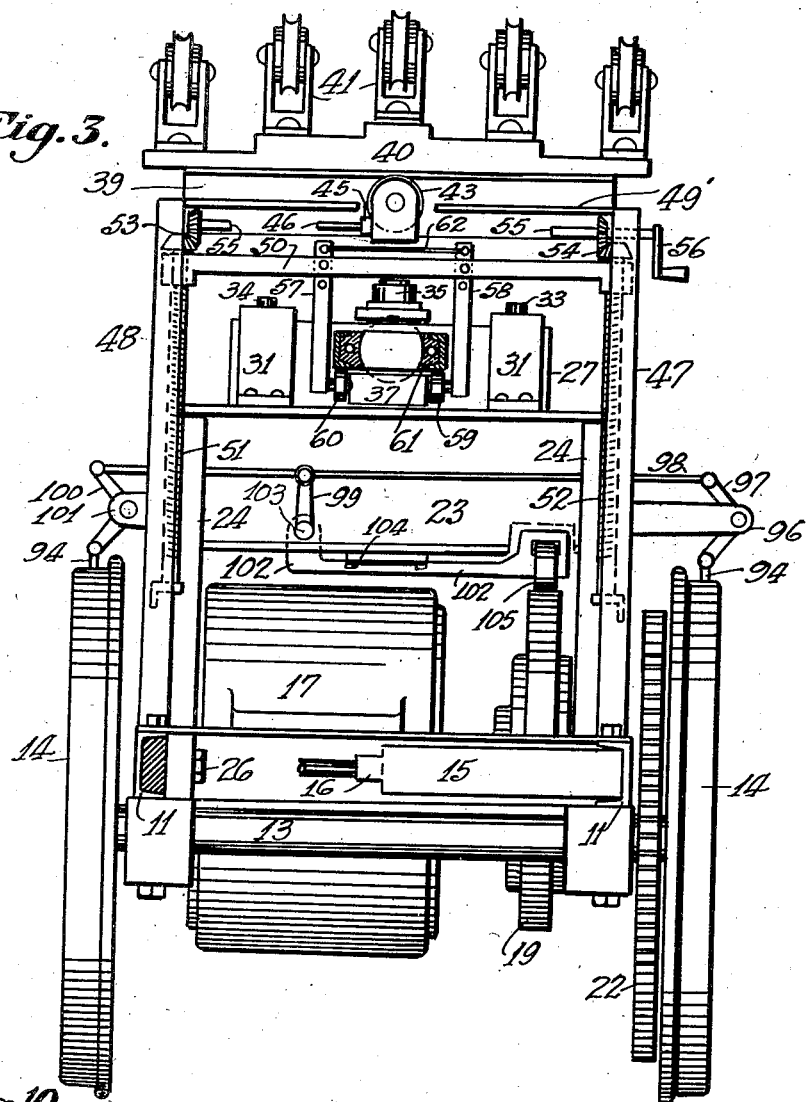
Fig. 3.
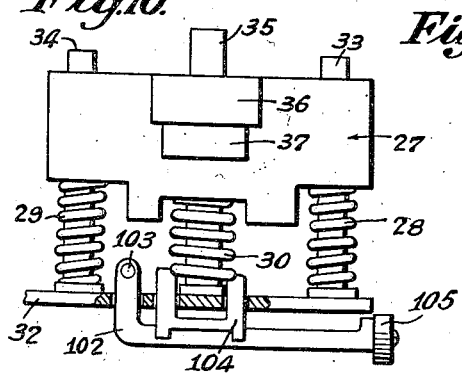
Fig. 10.
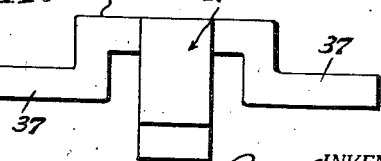
Fig. 11.
INVENTOR.
M. H. Loughridge Dec. 1, 1931.     M. H. LOUGHRIDGE     1,834,411
RAILWAY AND OTHER VEHICLE
Filed May 7, 1927     4 Sheets-Sheet 4
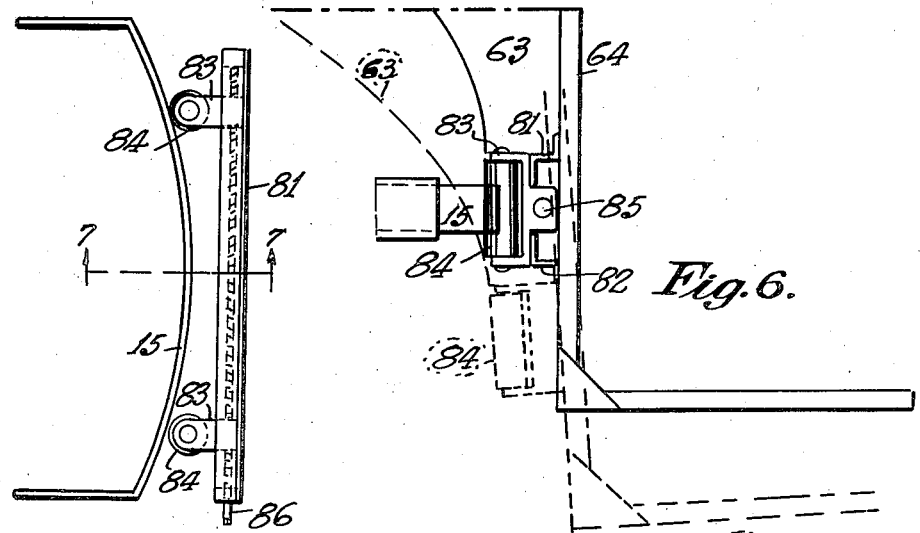
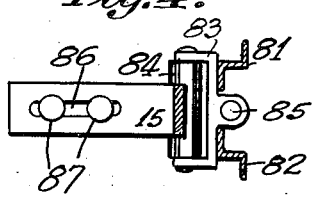
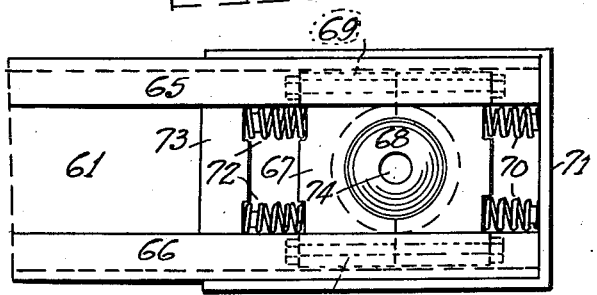
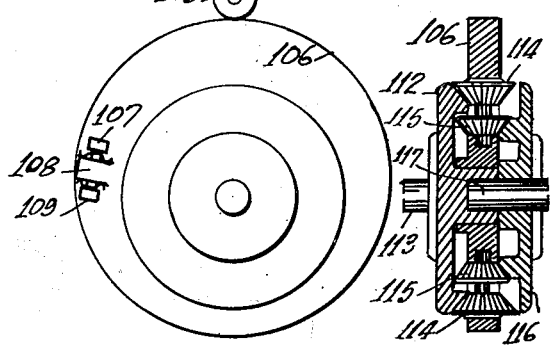
INVENTOR.
M. H. Loughridge Patented Dec. 1, 1931

1,834,411

UNITED STATES PATENT OFFICE

MATTHEW H. LOUGHRIDGE, OF BOGOTA, NEW JERSEY

RAILWAY AND OTHER VEHICLE

Application filed May 7, 1927. Serial No. 189,717.

This invention relates to railway and other vehicles and has for an object to provide vehicles comprising independent trucks which are constructed as motive units, are constructed to run in either direction, and which are coupled by one or more bodies or frames into a vehicle or a train of vehicles. The bodies are coupled to the trucks by a universal joint and are suspended between the trucks so that they can enter a narrow clearance. Other objects of the invention are to provide means for coupling and uncoupling the frames and the trucks, to provide means for operating the brakes on the trucks and to provide a bumper between the trucks and the bodies. Other objects of the invention will appear from the following specification and the accompanying drawings in which:

Fig. 3 is an end elevation of a railway truck complete with certain parts broken away to show the interior construction:

Fig. 4 is a plan view of the bumper arrangement:

Fig. 5 is a sectional elevation of the bumper on line 7—7 of Fig. 4:

Fig. 6 shows the relation of the bumper on the truck to the bumper members of the frame:

Fig. 7 is a plan view of the coupling arm:

Fig. 8 is a side elevation of the differential drive:

Fig. 9 is a cross section of the differential drive:

Fig. 10 is a side elevation of the bolster with its supporting springs:

Fig. 11 is a view of the bolster at right angles to Fig. 13.

Figure 1:
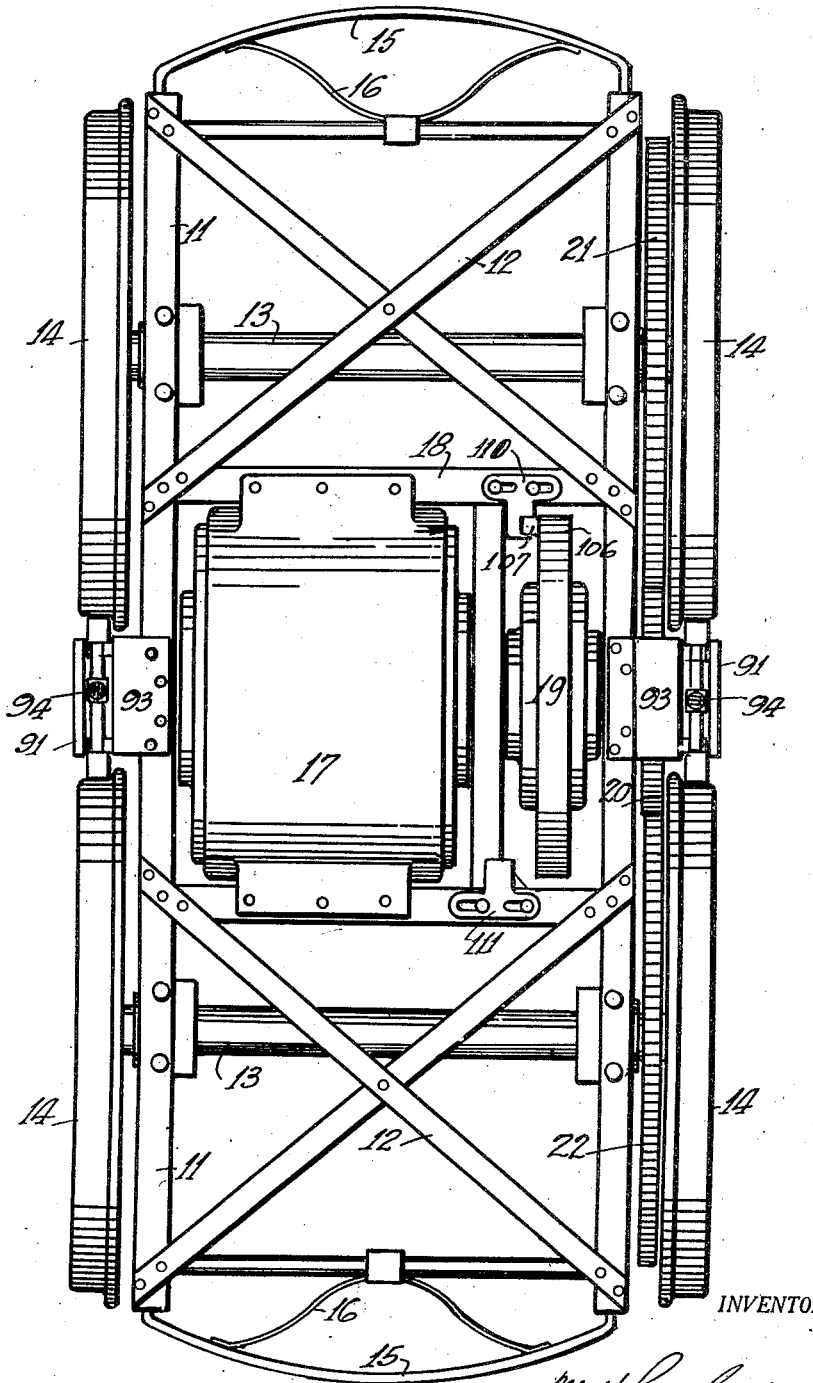
Fig. 1 is a plan view of a railway truck constructed according to this invention but with the superstructure removed.

In the drawings, 11 is the frame of the truck, preferably made from channel sections, which is cross braced at 12 and supported by suitable bearings on the axle 13 of the running wheels 14—14. The bumper 15 supported by the spring 16 is slidably secured to the frame at each end as hereinafter more particularly described. It will be observed that the truck is symmetrical about the transverse center each end having parts correspondingly referenced. The driving motor 17 is secured to the cross frame 18 and through the differential mechanism 19 drives the spur gear 20 engaging spur gears 21 and 22 of the running wheels as shown.

Figure 2:
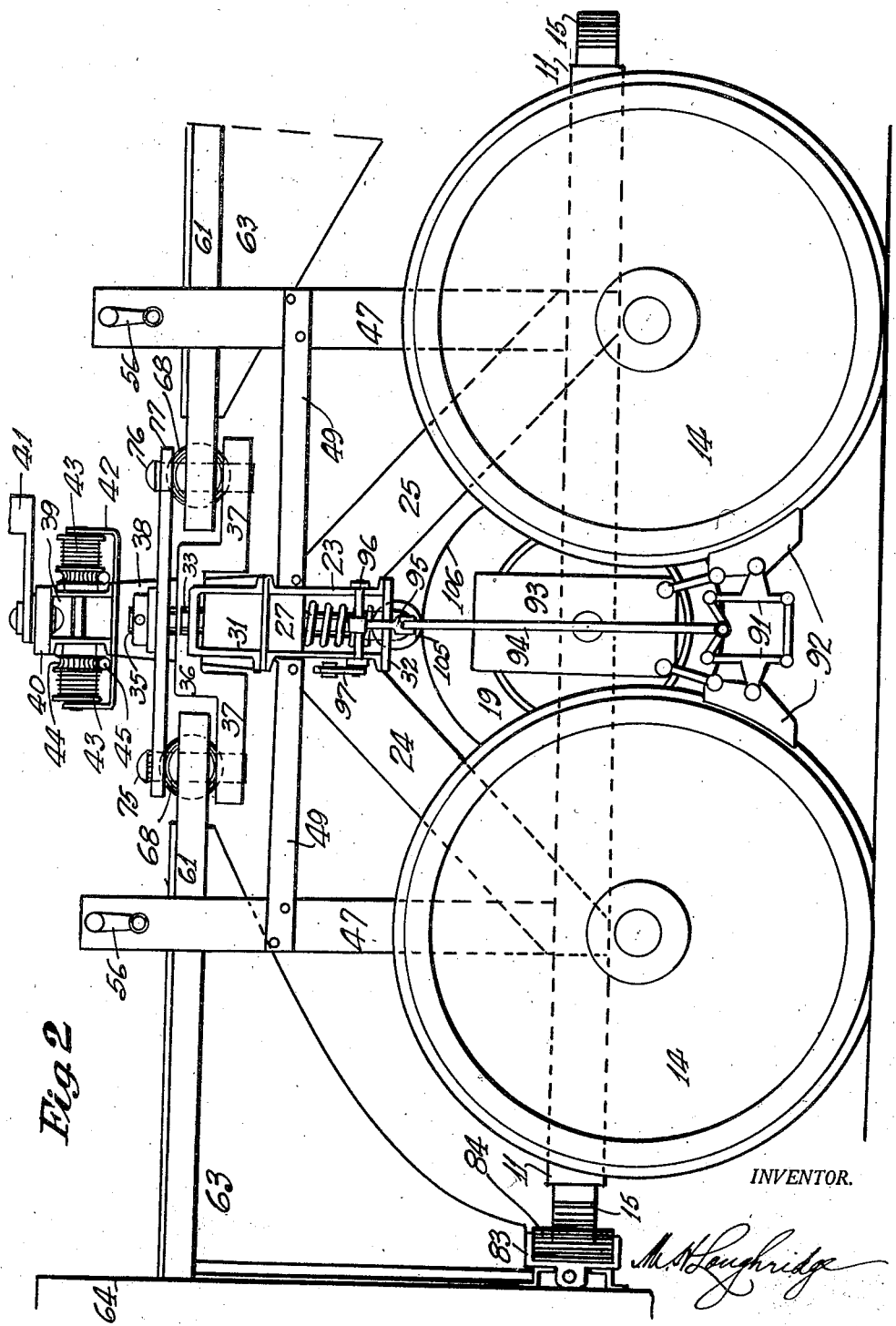
Fig. 2 is a side elevation of a truck corresponding to Fig. 1 with the superstructure in place coupled to bodies on each side.

On the frame 11, Fig. 2, a superstructure is built comprising a transverse channel 23 centered between the running wheels and supported from the truck frame as shown by the inclined members 24 and 25. These members may be secured to the frame by bolts 26 as shown in Fig. 3.

In the channel 23 the bolster 27 is arranged to slide vertically on the guide posts 33 and 34, Fig. 10. This bolster is supported on the coil springs 28 and 29 resting on the bottom plate 32 of the channel 23. The king pin 35 also passes through the bolster and holds in place the coil spring 30 hereinafter referred to. Guides 31—31, Figs. 2 and 3, are provided for the bolster 27 and for the posts 33 and 34. The bolster 27 has a right angle extension 36 centered on the longitudinal center of the truck with downwardly offset ends 37—37, Fig. 11, hereinafter referred to. A second transverse channel 39 is supported above the channel 23 by the bracket 38 and carries the bar of insulation 40 upon which the trolley wheels 41 are mounted to collect current for operating the vehicle. This channel, through the bracket 42, Fig. 2, supports the drums 43—43 on either side of the channel and which are operated by the worm wheel 44, worm 45 and shaft 46, Fig. 3, for purposes hereinafter described.

In Figs. 2 and 3 a transverse frame 47—48 is shown rising over the axle of each of the running wheels and braced to the members 24 and 25 by the braces 49—49, also by the cross brace 49'. These members are channel shaped and support the vertical screws 51 and 52 upon which the cross-head 50 moves up and down through the agency of the bevelled gears 53 and 54 operated by shaft 55 and handle 56. The cross head 50 has depending therefrom the pivoted members 57 and 58 which carry the rollers 59 and 60 and which, as shown in Fig. 3, engage below the coupling arm 61 of the frame. These rollers are held in the engaging position by the connection 62 which is removed when the rollers are to be disengaged.

The body frame 64, Fig. 2, is provided with coupling arms 61 extending on its longitudinal center beyond each of its ends and reinforced by the ribs 63—63. This coupling arm, Fig. 7, comprises a pair of opposed channels 65 and 66 in which the yoke 67 slides, its movement being restricted in either direction by the coil springs 70 engaging the end bar 71 and the coil springs 72 engaging the cross bar 73. This yoke is split transversely to clamp the ball 68, the two sections being secured together by the bolts 69.

When a frame is to be coupled to a truck the cross head 50 is lowered by handle 56 until the members 57 and 58 engage the coupling arm 61 as in Fig. 3 and by means of the handle the entire frame is raised until the ball 68 is above the extension 37 of the bolster. The cable on the drums 43 may be used to raise the coupling arms when the load is light and may also be used to draw the coupling arm forward to the coupling position on the rollers 59 and 60. A spherical aperture is provided in the extensions 37 and the pins 75 and 76 in the coupling bar 77 are inserted in the aperture 74, Fig. 7, of the balls and corresponding apertures in the arms 37. The king pin 35 passes through the coupling bar 77 and is provided with a collar and pin to hold this bar in place. Uncoupling one or both frames from a truck is the reverse of the process described. The coupling bar 77 is removed, then the frame is raised to disengage the ball 68 after which the frame is lowered to the ground. The ball 68 provides a universal joint in the coupling between the truck and the frame allowing the frame to swing freely sideways and also allowing for a free motion of the truck relative to the frame as it is subject to vertical vibration or movement and, at the same time, lateral displacement of the draw bar pull is provided for by the springs 70 and 72 in the coupling arm.

The coupling arms 61 for the average loading are located considerably above the center of gravity of the load on the frame. It is desirable therefore, particularly where long trains are formed from cars of this type, to provide a bumper located approximately on the line of the center of gravity of the load or at least on the line of the truck frame. This is secured by the bumper shown in Fig. 4 comprising the bar 15 which is curved to a radius struck from the center of the coupling pins 75 or 76 and slidable against the action of spring 16 in the channel frame through the slot 86, Fig. 5, and secured by the bolts 87. The frame is provided with a pair of transverse Z-bars 81—82 supporting a bracket 83 at one side carrying a roller 84 and a similar bracket with a corresponding roller similarly referenced on the other side of the center line of the truck. These brackets are slidable on the Z-bars and their position is regulated by the right and left hand thread of screw 86. When the cars are to be coupled the rollers 84 are spread apart as far as possible which slackens the coupling. After coupling these rollers are brought toward each other by the screw 86 until the entire coupling is under tension. It will be noted that these rollers bear equally on the bumper as the cars run on curves.

The container frames before coupling may have one end resting upon the rails of the track or ground as indicated by the dotted outline in Fig. 6. In this case it will be noted that the bumper 15 engages the rib 63 of the coupling arm until the frame is raised to the coupling position when the bumper is deflected against the roller 84.

A braking system is shown on these trucks similar to the braking system shown in application for U. S. patent, Serial No. 755,276, filed September 2, 1924. This comprises, as shown in Fig. 2, the foundation brake gear 91 operating the brake shoes 92, supported by plate 93, through the pull rod 94, connected to the crank 95, pivoted at 96 and crank 97 connected with brake rod 98 which connects to the crank 100 pivoted at 101, Fig. 3, and to the pull rod 94 on the opposite side of the vehicle. The brake rod 98 is connected by arm 99 with lever 102 through pivot 103. This lever, through the saddle 104, Fig. 10, sliding through apertures in plate 32, supports the spring 30 carrying part of the load on bolster 27. The end of lever 102 is provided with a roller 105 engaging the member 106, Figs. 8 and 9 of the differential driving mechanism.

The motor 17 drives the truck through the differential mechanism 19 which may be constructed as shown in Fig. 9. The motor shaft 117, through 116, drives the beveled gears 115—115 pivoted in the planetary member 106. The beveled gears 115 are rigidly connected with beveled gears 114 and drive the other side of the differential mechanism 112 on shaft 113 at a reduced speed. The planetary member 106 is constructed in the form of an eccentric as indicated in Fig. 8. If this planetary member is free to rotate it will introduce lost motion in the driving connection between the motor and the truck. It is desired to obtain such lost motion and to make the resistance of this lost motion gradually increase and be proportional to the load on the truck as the lost motion is taken up. This is secured by the resistance which lever 102 through roller 105 offers to the rotation of the planetary member 106 starting from the stop mechanism hereinafter referred to as it is elevated against spring 30 which supports part of the load. A stop is provided on the planetary member 106 comprising a plunger 107 mounted at 108 on the side of 106. This plunger is intended to work in both directions and for this reason is provided with the head 109 at the opposite end. Flat springs may be introduced below the head of this plunger as shown to cushion the effect of the stop. The member 110, Fig. 1, is mounted on the frame 18 to slide into the path of the plunger so as to stop the planetary member 106 when it elevates roller 105 in the highest position. A similar sliding stop 111 may be used, if desired, to stop the planetary member when the roller 105 is in the extreme lower position. This limits the planetary member to one half revolution in either direction between the stops so that when one stop is engaged roller 105 is in the extreme elevated position and the brakes are released, and when the other stop is engaged the support of the roller is removed and the brakes are applied. The sliding stops 110—111 are releasable so that 107 can be located above or below these stops according to the direction of running. It will be noted from Fig. 3 that when the roller 105 is raised the rod 98 is moved to the left and the brake rods 94—94 are lowered and the brakes released. When the planetary member 106 lowers the roller 105 the pressure of spring 30 on lever 102 and on brake rod 98 moves this rod to the right and applies the brakes proportional to the load on the vehicle.

From Fig. 8 it will be seen that the planetary member 106 will raise and lower the lever 102 as this member rotates in either direction, that is, as the truck runs in either direction.

The differential mechanism thus provides a gear reduction between the motor and the driving mechanism of the car, a lost motion connection between the motor and the driving mechanism, a connection between the motor and the driving mechanism which is taken up through a graduated lost motion proportional to the weight of the body, and, also, it operates the braking system. Each of these results are independent of the other and may be used alone or in such combinations as are desired.

This invention is shown applied to railway cars of light construction adapted for narrow gauge tracks. The cars are intended to be operated automatically from origin to destination and to attain considerable speed. As shown, there is practically no overhang of the cars beyond the rails and the center of gravity is low and close to the track. The car bodies comprising the frame and containers may have a capacity of three tons or more and due to the universal joint in the coupling between these bodies and the trucks and also to the fact that the center of gravity of the bodies is below the point of suspension, the bodies are free to swing like a pendulum on curves and in this way the centrifugal force, when taking curves at speed, is largely neutralized. This construction makes derailments almost impossible even when considerable speed is developed. The car trucks and the bodies are substantially in the same horizontal plane which enables the cars to be operated through a minimum clearance and the low bodies facilitate considerably the operation of loading and unloading. While the invention is shown applied to cars of the type described it should be understood that most of the principles herein described could, with advantage, be used on standard railroads and on road vehicles and the invention is not to be understood or construed as limited in any way to the light cars shown.

Having thus described my invention, I claim:

1. In a vehicle as described, the combination, a pair of trucks and a body, said trucks having bumpers engaging said body, said body pivotally suspended between said trucks above said bumpers and located substantially in the same horizontal plane as said trucks and forming means for coupling said trucks.

2. In a vehicle as described, the combination, a pair of trucks and a body, said body pivotally suspended between said trucks at a point above its centre of gravity and located substantially in the same horizontal plane as said trucks and having yieldable means for coupling said trucks and yieldable means for taking the compression between said trucks and body.

3. In a vehicle as described, the combination, a pair of trucks and a body, king pins and transverse spring supported bolsters on said trucks, said body pivotally suspended between said trucks on said bolsters and substantially in the same horizontal plane as said trucks and coupled to said trucks by couplers including said king pins forming universal joints.

4. In a vehicle as described, the combination, a pair of trucks and a body, a transverse spring supported bolster on each of said trucks, said body pivotally suspended between said trucks on said bolsters in the same horizontal plane as said trucks and coupled at each end to said trucks and a ball and socket connection associated with each of said couplers.

5. In a vehicle as described, the combination, a truck having a coupling pin or pins located substantially at its transverse centre, arc shaped end bumpers on the ends of said truck curved to arc with said coupling pin as a centre and located below the plane of the coupling pin and a body coupled to said truck by said coupling pin and engaging said bumper.

6. In a vehicle as described, the combination, a truck having a coupling pin located substantially at its transverse centre, arc shaped end bumpers on said truck curved to the radius of said coupling pin. a body coupled to said truck by said coupling pin and adjustable rollers on said body engaging said bumper.

7. In a vehicle as described, the combination, a pair of trucks and a body suspended between said trucks, coupler arms extending from each end of said body with means for coupling each arm to one of said trucks and means on each truck for raising said coupler arm to the coupling position.

8. In a vehicle as described, the combination, a pair of trucks and a body suspended between said trucks, coupler arms extending from each end of said body with means for coupling each arm to one of said trucks and a screw operated cross-head on each truck for raising and lowering the body in the operation of coupling and uncoupling.

9. In a vehicle as described, the combination, a truck and a body, said truck having a spring mounted bolster on the transverse centre of the truck and above the plane of the running wheels, said body located on substantially the same horizontal plane as said truck and having coupling arms projecting at each end and means for coupling the arms from a plurality of said bodies to said bolster.

10. In a vehicle as described, the combination, a truck having a frame substantially in line with the axles of the running wheels terminating in arcuate bumpers, a bolster located above the plane of the running wheels and a body with a coupling arm projecting in a plane substantially above the centre of gravity of the body coupling to said bolster and having means engaging said bumper.

11. In a vehicle as described, the combination, a truck having a frame terminating in arcuate bumpers, a body coupling to said frame and having adjustably positioned members in line with and engaging said bumper.

12. In a vehicle as described, the combination, a truck having a frame terminating in arcuate bumpers, a body coupling to said frame and having members adjustable transversely on said body engaging said bumper.

13. In a vehicle as described, the combination, a truck having a frame terminating in arcuate bumpers, a body coupling to said frame, members on said body engaging said bumper and a screw for adjusting the position of said members.

14. In a vehicle as described, the combination, a truck having a frame with a bolster, a body having a coupling arm coupling to said bolster, means on said truck for raising said coupling arm to the coupling position and a roller engagement between said means and said coupling arm.

15. In a vehicle as described, the combination, a truck having a frame with a bolster, a body having a coupling arm coupling to said bolster, a cable for engaging and raising said coupling arm to the coupling position, a roller for taking up said cable and means for operating said roller.

16. In a vehicle as described, the combination, a truck having a frame with a bolster and a controlling mechanism, a body having a coupling arm coupling to said bolster and a pivoted lever supporting said bolster and connected with said controlling mechanism.

17. In a vehicle as described, the combination, a truck having a frame with a bolster, a body having a coupling arm for supporting said body and a spring controlled sliding member in said coupling arm coupling to said bolster.

18. In a vehicle as described, the combination, a truck having a frame with a bolster, a body having a coupling arm, a ball mounted in said coupling arm and projecting at top and bottom and means in said bolster engaging the top and bottom of said ball for coupling said body to said truck.

19. In a vehicle as described, the combination, a truck having a frame and a controlling mechanism, a bolster mounted in said frame on vertical guides, springs supporting said bolster, a lever connected to said bolster and connected to said controlling mechanism, a body having a coupling arm carrying the weight of the body and means coupling said arm to said bolster.

20. In a vehicle as described, the combination, a truck having a frame, a transverse bolster mounted in said frame on vertical guides, springs supporting said bolster, an arm projecting on each side below the top of said bolster and a coupling pin associated with each of said arms.

21. A vehicle truck comprising two pairs of wheels and a channel iron frame mounted to form a bogie, coupling means vertically centered in said frame and bar bumpers for the ends of said frame arranged to slide in the channels of said frame.

22. A vehicle truck comprising two pairs of wheels and a frame mounted upon the axles of said wheels to form a bogie, said frame having a pair of triangular members, upstanding above the plane of said frame, a bolster supported by said members on the transverse center of said truck and springs supporting said bolster.

23. A vehicle truck comprising two pairs of wheels and a frame mounted to form a bogie, said frame having a pair of upstanding triangular members, transverse members connecting said triangular members at their apex and a bolster yieldingly supported by said transverse members.

24. A vehicle truck comprising two pairs of wheels and a frame mounted to form a bogie, said frame having a pair of side members, transverse members connecting said members and a rigid king pin and a sliding bolster supported by said transverse members.

25. A vehicle truck comprising two pairs of wheels and a frame mounted to form a bogie, said frame having a pair of upstanding triangular members, a transverse member connecting said triangular members and supporting a bolster and a second transverse member supported by said frame above said first mentioned transverse member and controlling devices supported by said second transverse member.

26. A vehicle truck comprising two pairs of wheels and a frame mounted to form a bogie, said frame having a pair of upstanding members, a member located on the transverse centre of said truck and connecting said upstanding members, a bolster yieldingly supported by said member and a king pin rigidly supported by said member.

27. A vehicle truck comprising two pairs of wheels and a frame mounted to form a bogie, said frame having a pair of upstanding members, a member located on the transverse centre of said truck and connecting said upstanding members, a bolster supported by said member, a motor supported by said frame below said member and means operatively connecting said motor with said wheels to drive said truck.

28. A vehicle truck comprising two pairs of wheels and a frame mounted to form a bogie, said frame having a pair of upstanding members, a member located on the transverse centre of said truck and connecting said upstanding members, a bolster supported by said member, a second member supported by said frame above said bolster, a motor supported by said frame below said member, means connecting said motor with the wheels of said truck and means supported by said second member controlling the operation of said motor.

29. A vehicle bogie truck comprising a self supporting frame with a pair of upstanding members, a member located on the transverse centre of said truck connecting said upstanding members, coupling means associated with said member for coupling adjacent car ends, a second member supported by said frame and located above said first mentioned member and means supported by said second member for placing said car ends in the coupling position.

30. A vehicle bogie truck comprising a self supporting frame with a pair of upstanding members, a member located on the transverse centre of said truck supported by said upstanding members, an arm coupled with said member, a second member supported by said frame on a plane above said first mentioned member and a hoist associated with said second member for raising and lowering said arm.

31. A vehicle bogie truck comprising a self supporting frame with a pair of upstanding members, a member located on the transverse centre of said truck supported by said upstanding members, an arm coupled with said member, means for elevating said arm and rollers embodied in said truck engaging said arm in the elevated position whereby said arm may be rolled into the coupling position when elevated.

32. A vehicle bogie truck comprising a frame mounted on the wheel axles, a member supported by said frame on the transverse centre of said truck, an arm coupled with said member and a screw operated cross-head supported by said frame and engaging said arm with a slidable engagement for raising said arm to the coupling position.

33. A vehicle truck comprising a frame mounted on the wheels of said truck, a member supported by said frame on the transverse centre of said truck, an arm coupled with said member, a screw operated cross-head supported by said frame and means depending from said cross-head engaging said arm to raise said arm to the coupling position.

34. A vehicle truck comprising a frame mounted on the wheels of said truck, a member supported by said frame on the transverse centre of said truck, an arm coupled with said member, a screw operated cross-head supported by said frame, means depending from said cross-head and means for engaging and disengaging said means with said arm in the coupling operation.

35. A vehicle truck comprising a frame mounted on the wheels of said truck, a member supported by said frame, coupling means associated with said member, an arm coupled with said member and manually operated means on said truck for raising said arm to the coupling position and for lowering said arm from the coupling position.

36. A vehicle truck comprising a frame mounted on the wheels of said truck, a member supported by said frame, coupling means associated with said member, a pair of arms coupled with said member on opposite sides and means on said truck for raising said arms to the coupling positions and for lowering said arms from the coupling positions.

37. A vehicle truck comprising a frame mounted on the wheels of the truck, means on said frame for coupling said truck with adjoining vehicles on either side and means on said truck for raising each of the adjoining vehicles to the coupling position.

38. A vehicle truck comprising a frame mounted on a pair of axles, means on said frame for coupling said truck with adjoining vehicles on either side and side members on said frame, within the vertical plane extending between said axles for raising the adjoining vehicles to the coupling position.

39. A vehicle truck comprising a frame mounted on the wheels of the truck, means on said frame for coupling said truck with an adjoining vehicle, elevator means on said truck for elevating the adjoining vehicle to the coupling position and a roller embodied in said truck engaging said vehicle in the coupling position.

40. A vehicle truck comprising a frame mounted on the wheels of the truck, means on said frame for coupling said truck with an adjoining vehicle, elevator means on said truck for elevating the adjoining vehicle to the coupling position and a pair of pivoted members connecting said elevator means with said vehicle.

In testimony whereof I affix my signature.

MATTHEW H. LOUGHRIDGE.